United States Patent
Schroeder et al.

(10) Patent No.: US 10,717,442 B2
(45) Date of Patent: Jul. 21, 2020

(54) METHOD AND APPARATUS FOR DETERMINING A PRESENTLY EXISTING DRIVING SITUATION

(71) Applicant: Robert Bosch GmbH, Stuttgart (DE)

(72) Inventors: Christoph Schroeder, Sunnyvale, CA (US); Oliver Pink, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 369 days.

(21) Appl. No.: 15/516,494

(22) PCT Filed: Oct. 12, 2015

(86) PCT No.: PCT/EP2015/073570
§ 371 (c)(1),
(2) Date: Apr. 3, 2017

(87) PCT Pub. No.: WO2016/066416
PCT Pub. Date: May 6, 2016

(65) Prior Publication Data
US 2018/0222486 A1 Aug. 9, 2018

(30) Foreign Application Priority Data
Oct. 27, 2014 (DE) .................. 10 2014 221 803

(51) Int. Cl.
*B60W 40/04* (2006.01)
*G06K 9/00* (2006.01)
(Continued)

(52) U.S. Cl.
CPC ............ *B60W 40/04* (2013.01); *B60W 40/02* (2013.01); *G05D 1/0088* (2013.01);
(Continued)

(58) Field of Classification Search
CPC .... B60W 40/04; B60W 40/02; G05D 1/0088; G06K 9/00771; G06K 9/00785; G06N 5/047; G08G 1/00; G08G 1/16
(Continued)

(56) References Cited

U.S. PATENT DOCUMENTS 8,718,861 B1 * 5/2014 Montemerlo ......... B60W 30/00
701/26
9,697,430 B2 * 7/2017 Kristensen ......... G06K 9/00818
(Continued)

FOREIGN PATENT DOCUMENTS

CN 103890824 A 6/2014
DE 102005052175 A1 5/2007
(Continued)

OTHER PUBLICATIONS

International Search Report dated Jan. 27, 2016, of the corresponding International Application PCT/EP2015/073570 filed Oct. 12, 2015.
(Continued)

*Primary Examiner* — Thomas G Black
*Assistant Examiner* — Luat T Huynh
(74) *Attorney, Agent, or Firm* — Norton Rose Fulbright US LLP; Gerard Messina

(57) ABSTRACT

A method for determining a presently existing driving situation in which a vehicle finds itself at the moment. The method includes receiving of driving-environment data based on a sensed vehicle driving environment, extracting of features from the driving-environment data with the aid of pattern recognition, classifying the presently existing driving situation based exclusively on the features extracted by the pattern recognition, and providing a result of the classification. A corresponding apparatus, a corresponding system as well as a computer program, are also described.

11 Claims, 4 Drawing Sheets

(51) Int. Cl.
*G08G 1/00* (2006.01)
*B60W 40/02* (2006.01)
*G08G 1/16* (2006.01)
*G05D 1/00* (2006.01)
*G06N 5/04* (2006.01)

(52) U.S. Cl.
CPC ..... *G06K 9/00771* (2013.01); *G06K 9/00785* (2013.01); *G06N 5/047* (2013.01); *G08G 1/00* (2013.01); *G08G 1/16* (2013.01)

(58) Field of Classification Search
USPC .......................................................... 701/117
See application file for complete search history.

(56) References Cited

U.S. PATENT DOCUMENTS

| | | | | |
|---|---|---|---|---|
| 2004/0252027 | A1* | 12/2004 | Torkkola | G08B 21/06 340/576 |
| 2016/0068156 | A1* | 3/2016 | Horii | B60W 30/00 701/28 |
| 2017/0080950 | A1* | 3/2017 | Pink | G06K 9/6289 |
| 2018/0329427 | A1* | 11/2018 | Pink | B60W 30/00 |

FOREIGN PATENT DOCUMENTS

| | | |
|---|---|---|
| DE | 102012109377 A1 | 4/2014 |
| EP | 1927866 A1 | 6/2008 |
| JP | 2013073620 A | 4/2013 |
| JP | 2014137743 A | 7/2014 |

OTHER PUBLICATIONS

Sikiric Ivan et al: "Image Representations on a Budget: Traffic scene classification in a restricted bandwidth scenario", 2014 IEEE Intelligent Vehicles Symposium Proceedings, IEEE, Jun. 8, 2014 (Jun. 18, 2014), pp. 845-852.

Sikiric Ivan et al: "Multi-Label Classification on Traffic Scenes", Proceedings of the Croation Computer Vision Workshop 2014, CCVW 2014, Sep. 16, 2014 (Sep. 16, 2014), pp. 9-14, Zagreb, Croatia.

Klaus Dietmayer et al: "Repärsentation fusionierter Umfelddaten" [Representation of amalgamated surroundings data] In: "Handbuch Fahrerassistenzsysteme" "Handbook Driver Assistant Systems", Jan. 1, 2015 (Jan. 1, 2015) pp. 453-480.

Michael Darms: "Kapitel 24: Fusion umfelderfassender Sensoren" [Amalgamation of surroundings—detecting sensors] In: "Handbuch Fahrerassistenzsysteme" "Hanbook Driver Assistant Systems", Jan. 1, 2015 (Jan. 1, 2015) pp. 439-451.

* cited by examiner

METHOD AND APPARATUS FOR DETERMINING A PRESENTLY EXISTING DRIVING SITUATION

FIELD

The present invention relates to a method and an apparatus for determining a presently existing driving situation in which a vehicle finds itself at the moment. In addition, the present invention relates to a corresponding system, as well as a corresponding computer program.

BACKGROUND INFORMATION

Driver assistance systems and future automated driving functions are intended only for a specific field of application, within which they must function reliably. With the increasing number of functions, the judgment as to whether a function can operate within its system limits and therefore may safely be activated in the current or present driving situation is becoming more and more difficult for the average driver. It is therefore sensible to relieve the driver of having to make this judgment, and to offer the activation of the function only if a controllable situation exists (for example, activation of a traffic-jam assist only if there is currently a traffic jam, activation of a road-construction-site assist only within road-construction sites, activation of a maneuvering assist only within a parking place/parking garage).

In the case of systems for highly automated driving, for safety reasons (no driver as fallback level), an activation outside of the system limits must absolutely be avoided. Methods for reliably determining the current driving situation are therefore a key technology for the implementation of automated driving.

SUMMARY

An object of the present invention is to provide a method for determining a presently existing driving situation in which a vehicle finds itself at the moment.

An object underlying the present invention may also include the provision of a corresponding apparatus.

An object of the present invention may also include the indication of a corresponding system.

An object of the present invention may also include the indication of a corresponding computer program.

Advantageous developments of the present invention are described herein.

According to one aspect of the present invention, a method is provided for determining a presently existing driving situation in which a vehicle finds itself at the moment, including the following steps:

Receiving of driving-environment data based on a sensed vehicle driving environment, Extracting of features from the driving-environment data with the aid of pattern recognition, Classifying the presently existing driving situation based exclusively on the features extracted by the pattern recognition, Providing a result of the classification.

According to a further aspect, an apparatus is provided for determining a presently existing driving situation in which a vehicle finds itself at the moment, including:

a communication interface for receiving driving-environment data based on a sensed vehicle driving environment, a processing device for extracting features from the driving-environment data with the aid of pattern recognition, and for classifying the presently existing driving situation based exclusively on the features extracted by the pattern recognition, the communication interface being designed to provide a result of the classification.

Therefore, since the apparatus classifies the presently existing driving situation, the apparatus may also be referred to as a classifier, for example.

According to a further aspect, a system is provided for determining a presently existing driving situation in which a vehicle finds itself at the moment, including:

the apparatus according to the present invention, a driving-environment sensor system for sensing a vehicle driving environment, the driving-environment sensor system being designed to determine driving-environment data based on the sensed vehicle driving environment and to transmit it to the apparatus, a control device for the at least partially automated guidance of the vehicle based on the result provided.

According to another aspect, a computer program is provided which includes program code for carrying out the method according to the present invention when the computer program is executed on a computer.

In particular, the present invention thus includes classifying the presently existing driving situation based exclusively on the features extracted with the aid of pattern recognition. This in contrast to existing approaches for classifying a situation, which attempt to describe a relationship of the other road users to one's own vehicle, which may also be referred to as ego vehicle, for example, "driving ahead with distance x", "driving in the adjacent lane", "is parked", etc., to in turn derive from it the instantaneous driving situation, e.g., "waiting at traffic signal", "driving in traffic jam", and so forth. This information, thus, these relationships of the other road users to the ego vehicle, may only be determined on the basis of a pattern analysis of the sensed vehicle driving environment. However, in contrast to that, according to the present invention, only a pattern recognition is carried out for the extraction of features. A pattern analysis going beyond that, in order to extract still further information from the sensed vehicle driving environment is not necessary in the present invention. Thus, the features extracted with the aid of the pattern recognition are sufficient. Generally, a pattern recognition is faster and easier to implement than a pattern analysis. In this respect, the steps of the present invention may be carried out quasi in real time, thus, while driving or during the operation of the vehicle. Consequently, the computing expenditure needed is reduced markedly compared to conventional methods for scene interpretation (based on a pattern analysis), which is of significant importance for online use in the vehicle. At the same time, advantageously, the direct classification on the basis of the driving-environment data is able to increase the quality of the classification considerably.

The present invention thus skips the step of describing the individual objects in the scene, that is, the individual objects in the sensed vehicle driving environment, and classifies a situation directly on the basis of an existing driving-environment model. In accordance with the present invention, in order to classify the overall situation, thus, the present traffic situation in which the vehicle finds itself at the moment, for example, "driving in traffic jam", the exact properties, positions or intentions of individual vehicles in the vehicle driving environment are not necessary, but rather, that this conclusion may already be tied to considerably more general features of the scene, e.g., number of vehicles, absolute speeds of the vehicles. Advantageously, these more general features may be extracted from the sensed vehicle driving environment with the aid of pattern recognition.

According to one specific embodiment, a driving-environment sensor system is formed. For example, the driving-environment sensor system includes one or more driving-environment sensors for sensing a vehicle driving environment. In particular, the plurality of driving-environment sensors are formed identically or, by preference, differently. For instance, a driving-environment sensor is one of the following driving-environment sensors: radar sensor, laser sensor, lidar sensor, ultrasonic sensor and video sensor.

According to one specific embodiment, the vehicle includes a driving-environment sensor system having a plurality of driving-environment sensors, the driving-environment sensors each sensing the vehicle driving environment and providing individual driving-environment sensor data corresponding to the vehicle driving environment sensed in each case, the individual driving-environment sensor data being merged together, so that merged driving-environment sensor data is determined, the driving-environment data being ascertained based on the merged driving-environment sensor data.

That is, given the presence of a plurality of driving-environment sensors, it is not the data of one individual sensor, but rather, in particular, the merger result of all driving-environment sensors which is used or employed as input for the classification. Accuracy of the classification may thereby be increased in advantageous manner. The reason is that, for example, the driving-environment sensors are thus able to mutually compensate for their individual weaknesses possibly existing with regard to sensing of the vehicle driving environment.

According to another specific embodiment, based on the sensed vehicle driving environment, an occupancy grid is determined, including a plurality of cells, each of which has an occupancy probability, the driving-environment data being determined based on the respective occupancy probabilities.

Due to the gridlike configuration of the cells, the driving-environment data has the same form as image data, and therefore, in particular, may advantageously be used or employed directly as input for a method for scene categorization from images. Advantageously, this also reduces computing expenditure. In particular, computing time is reduced.

According to one specific embodiment, the occupancy probabilities are determined based on the merged driving-environment sensor data, the driving-environment data being ascertained based on the respective occupancy probabilities. Since the driving-environment data is based on the respective occupancy probabilities, and the occupancy probabilities are based on the merged driving-environment sensor data, in this sense, the driving-environment data is also based, at least indirectly, on the merged driving-environment sensor data.

In another specific embodiment, the cells are additionally assigned a further property which is determined based on the sensed vehicle driving environment. In particular, this yields the technical advantage that the occupancy grid even better reflects the vehicle driving environment, which ultimately leads to a more accurate classification.

According to a further specific embodiment, the vehicle has a driver assistance system for making an at least partially automated, preferably fully automated driving function available, the driver assistance system being activated to guide the vehicle only if the driving function is usable for the classified driving situation existing at the moment. In particular, this provides the technical advantage of ensuring that the activation conditions are satisfied for an automated driving function if it is intended to be usable only in a specific driving situation (for example, only in parking places, only on freeways, etc.).

In another specific embodiment, the classification is carried out based on a method for scene categorization from images.

According to one specific embodiment, the method for scene categorization is what is referred to as the "deep learning" method. As shown in FIG. 6, in that case, an image (occupancy image) of the driving environment is determined based on all sensors. According to one specific embodiment, the ascertained image is scaled down in order advantageously to reduce computing time for the classification.

According to a further specific embodiment, a classifier is trained with a portion of the recorded data (occupancy image), which preferably is labeled or classified according to situations, and according to another specific embodiment, the classifier is tested with the other portion of the data.

In the case of the classifier, advantageously, no specific features have to be extracted; they are determined independently by the classifier during the training.

The situations in which this type of classification functions well are, for example: Freeway driving as against driving in a traffic jam as against a country road as against an intersection situation as against a parking-place situation as against urban driving.

In this context, a self-movement of the vehicle may, but does not have to be used as additional parameter for the classification, as well.

It is advantageous that the method establishes no relationships between objects and the ego vehicle. This procedure is based on the idea of the present invention that, in order to classify the overall situation, for example, "driving in traffic jam", the exact properties, positions or intentions of individual vehicles are not necessary, but rather, that this conclusion, thus, the classification, may already be made or tied to considerably more general features of the scene, for example, number of vehicles (e.g., density of the occupancy in the occupancy grid), absolute speeds, etc.

Preferably, the communication is carried out via a communication network, e.g., a CAN bus. In particular, the communication interface receives the relevant data (for example, driving-environment data) via the communication network. Specifically, the communication interface makes the result available via the communication network, makes available meaning, namely, transmits.

In one specific embodiment, the guidance of the vehicle includes especially a longitudinal guidance and/or a lateral guidance of the vehicle. In particular, a partially automated, preferably fully automated guidance is provided.

Specific embodiments with regard to the method are yielded analogously from specific embodiments with regard to the apparatus and/or the system and, in each case, vice versa in any combination. That is, implementations, features and/or technical effects and/or technical advantages as described in connection with the method, the apparatus or the system hold true analogously for the apparatus, the method or the system.

The present invention is explained in greater detail below on the basis of preferred exemplary embodiments.

DETAILED DESCRIPTION OF EXAMPLE EMBODIMENTS APPARATUS

Figure 1:
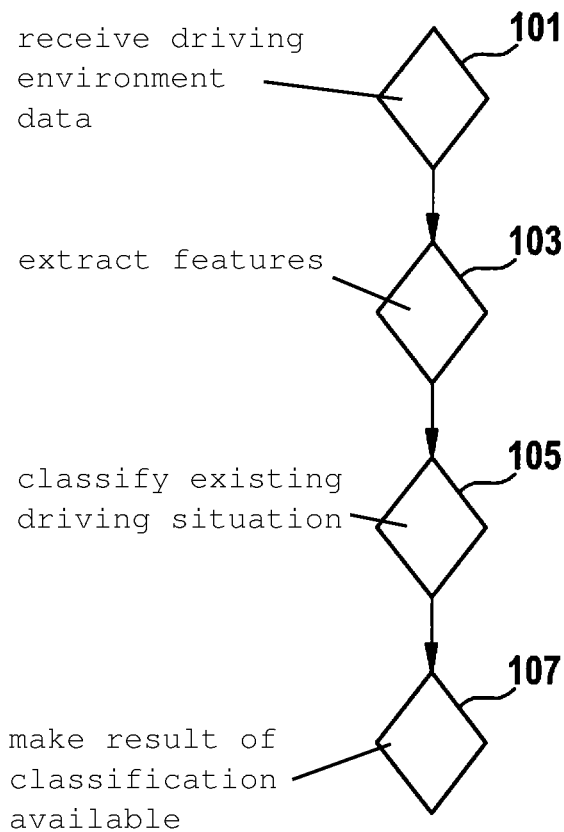
FIG. 1 shows a flowchart of a method for determining a presently existing driving situation in which a vehicle finds itself at the moment.

FIG. 1 shows a flowchart of a method for determining a presently existing driving situation in which a vehicle finds itself at the moment.

In a step 101, driving-environment data is received, this driving-environment data being based on a sensed vehicle driving environment. For example, the vehicle driving environment is sensed with the aid of a driving-environment sensor system. In a step 103, features are extracted from the driving-environment data. This is accomplished with the aid of pattern recognition. In a step 105, the presently existing driving situation is then classified. This is done based exclusively on the features extracted by the pattern recognition. That is, no pattern analysis of the driving-environment data is carried out for the classification. In a step 107, the result of the classification is made available.

Figure 2:
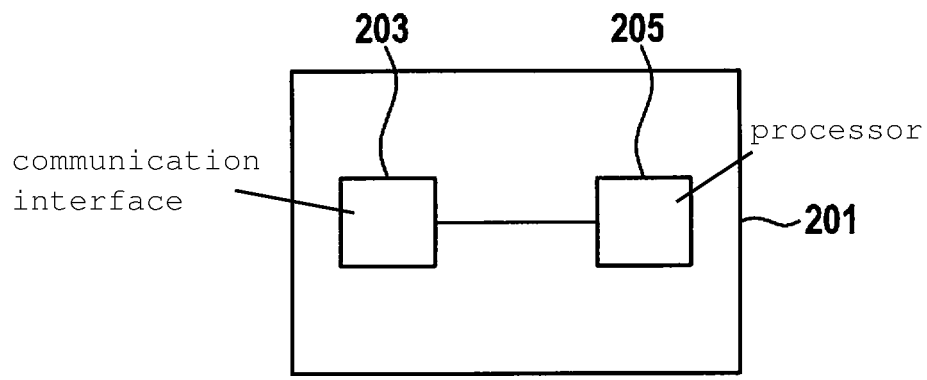
FIG. 2 shows an apparatus for determining a presently existing driving situation in which a vehicle finds itself at the moment.

FIG. 2 shows an apparatus 201 for determining a presently existing driving situation in which a vehicle finds itself at the moment.

Apparatus 201 includes a communication interface 203 for receiving driving-environment data based on a sensed vehicle driving environment. Apparatus 201 also includes a processing device 205 for extracting features from the driving-environment data with the aid of pattern recognition, and for classifying the presently existing driving situation based exclusively on the features extracted by the pattern recognition. Communication interface 203 is designed to provide or transmit a result of the classification.

Figure 3:
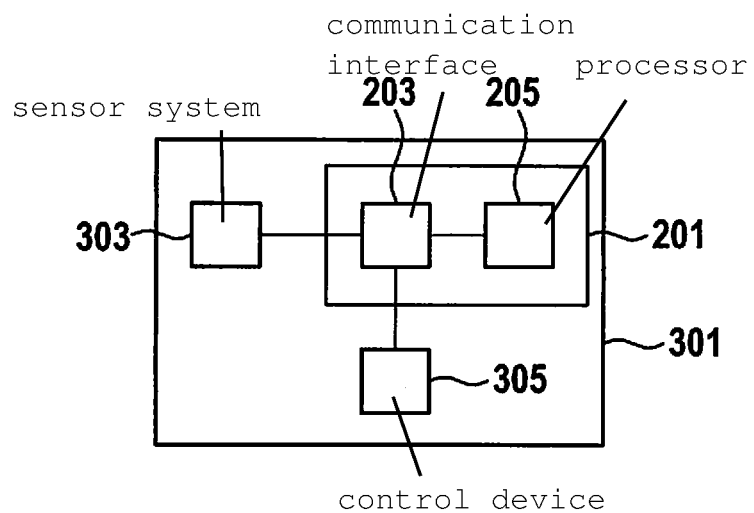
FIG. 3 shows a system for determining a presently existing driving situation in which a vehicle finds itself at the moment.

FIG. 3 shows a system 301 for determining a presently existing driving situation in which a vehicle finds itself at the moment.

System 301 includes apparatus 201 according to FIG. 2. System 301 also includes a driving-environment sensor system 303 for sensing a vehicle driving environment. Driving-environment sensor system 303 is designed to determine driving-environment data based on the sensed vehicle driving environment, and to transmit it to apparatus 201. Thus, communication interface 203 of apparatus 201 is then able to receive this driving-environment data and further process it. System 301 also includes a control device 305 for the at least partially automated guidance, preferably fully automated guidance, of the vehicle based on the result provided.

Figure 4:
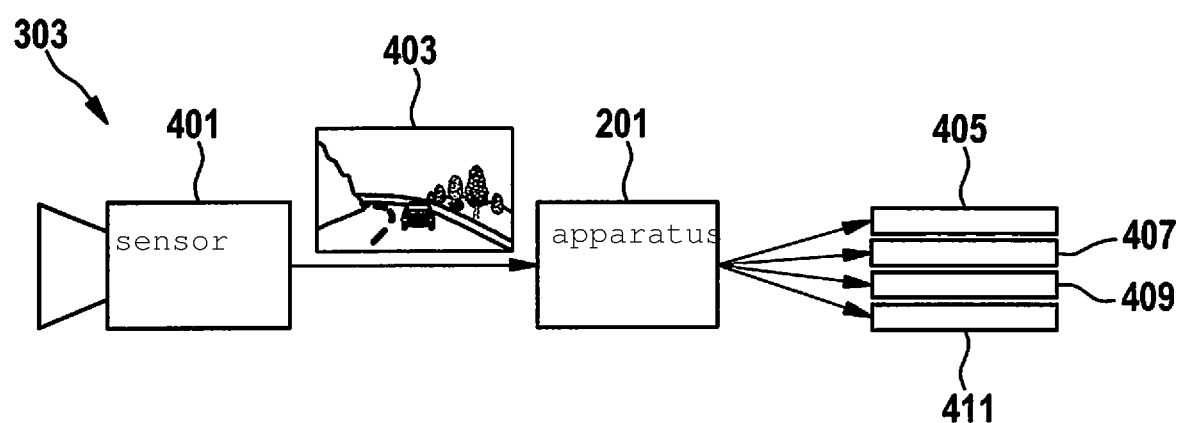
FIG. 4 shows a block diagram of a situation classification.

In particular, the guidance of the vehicle includes longitudinal guidance and/or lateral guidance of the vehicle FIG. 4 shows a block diagram of an image-based situation classification.

A sensor 401 of driving-environment sensor system 303 is shown. For example, sensor 401 is a video sensor. Sensor 401 senses a vehicle driving environment. In the case of a video sensor, this is a video image. The sensed driving environment is identified symbolically by reference numeral 403. Sensed driving environment 403 is then used to implement an image-based situation classification, using a method for scene categorization in images. To that end, sensed driving environment 403, or more precisely, the driving-environment data based on it, is supplied to apparatus 201. It extracts features from the sensed vehicle driving environment, thus, for example, from the video image, with the aid of pattern recognition. The presently existing driving situation is classified by apparatus 201 based exclusively on the features extracted by the pattern recognition. The result of the classification is then made available. For example, results of the classification may be the following: freeway driving 405, driving in a traffic jam 407, driving at an intersection 409 and driving in a parking garage 411.

According to the specific embodiment in FIG. 4, the sensing of the vehicle driving environment by a single driving-environment sensor is used for the extraction of the features. That is, features are extracted from a single driving-environment sensor, so to speak, and a classification into the various driving situations to be expected is implemented on the basis of these extracted features.

Therefore, since apparatus 201 ultimately classifies the presently existing driving situation, apparatus 201 may also be referred to as a classifier, for example.

Figure 5:
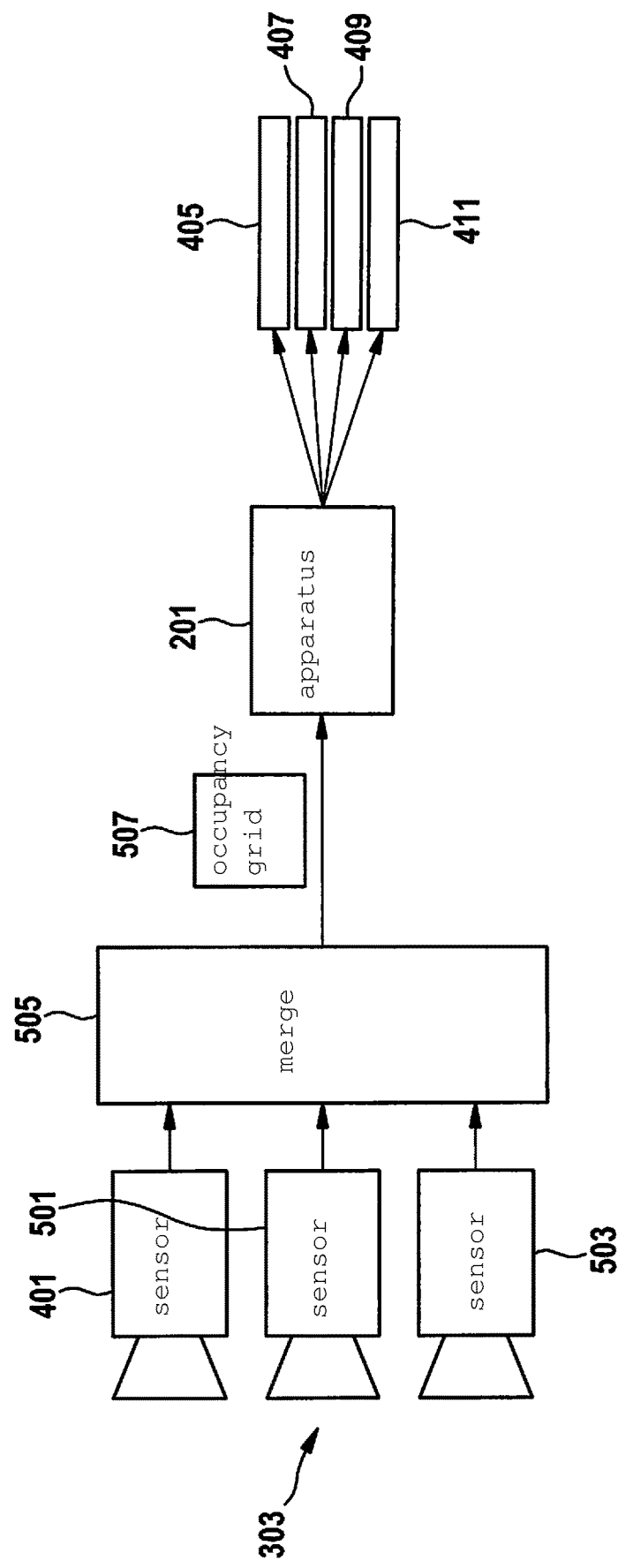
FIG. 5 shows a block diagram of a further situation classification.

FIG. 5 shows a block diagram of a further situation classification based on an occupancy grid, using a method for scene categorization in images.

Here, driving-environment sensor system 303 includes a plurality of sensors 401, 501, 503. For example, sensor 401 is a video sensor. Sensor 501 is a radar sensor, for example. Sensor 503 is an ultrasonic sensor or a lidar sensor, for instance. Given the presence of this plurality of driving-environment sensors 401, 501, 503, preferably, it is not the sensor data of a single sensor which is used, but rather, the merger result of all sensors 401, 501, 503 which is used as input of the classification, thus, as input for apparatus 201. That is, each driving-environment sensor 401, 501, 503 senses the vehicle driving environment and provides individual driving-environment sensor data corresponding to the vehicle driving environment sensed in each case, the individual driving-environment sensor data being merged together, so that merged driving-environment sensor data is determined, the driving-environment data being ascertained based on the merged driving-environment sensor data. This driving-environment data is then made available to apparatus 201. The merger is carried out in block 505. The merged driving-environment sensor data may be used for ascertaining an occupancy grid 507 which includes a plurality of cells, each of which has an occupancy probability. Thus, a driving-environment representation is provided here in the form of an occupancy grid, in which the entire vehicle driving environment is represented in the form of cells with an occupancy probability and, for example, optionally, further properties, e.g., speed of the cells. Due to the gridlike configuration of the cells of the occupancy grid, the data which is assigned to the cells has the same form as image data and may therefore be used directly as input for a method for scene categorization from images. In this context, according to the present invention, the classification is thus carried out using such a method for scene categorization from images. For example, analogous to FIG. 3, results of the classification are the following: freeway driving 405, driving in a traffic jam 407, driving at an intersection 409 and driving in a parking garage 411.

Figure 6:
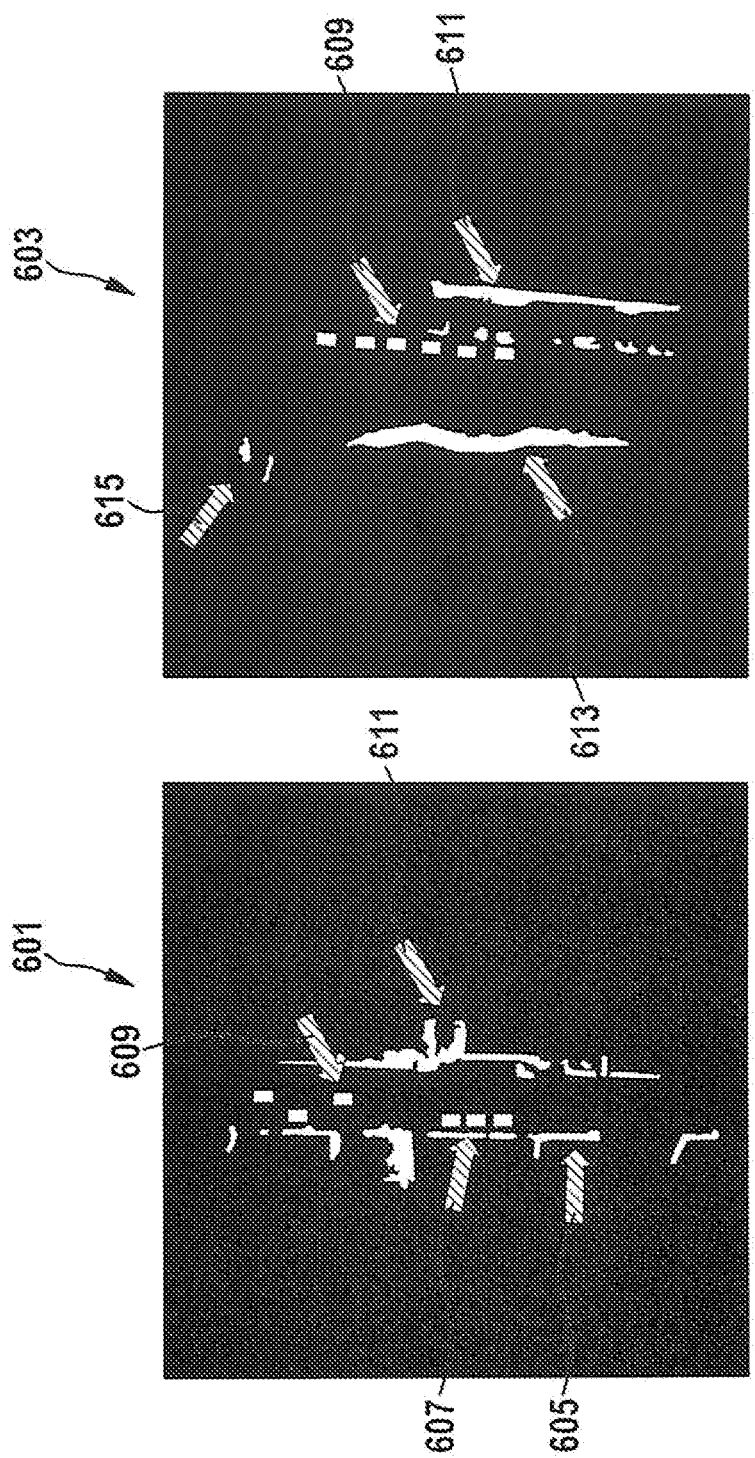
FIG. 6 shows two examples for a driving-environment representation in an occupancy grid for two different situations.

FIG. 6 shows two examples for a driving-environment representation in an occupancy grid for two different situations.

Reference numerals 601 and 603 each point to an occupancy grid that represents a driving environment. In addition, arrows are marked in, which point to objects in the driving environment. The arrow having reference numeral 605 points to an exterior housing wall. The arrow having reference numeral 607 points to a parking vehicle. The arrow having reference numeral 609 points to vehicles. The arrow having reference numeral 611 points to a roadside building development (e.g., houses). The arrow having reference numeral 613 points to an embankment. The arrow having reference numeral 615 points to an obstacle. The white areas or cells in occupancy grids 601 and 603 indicate occupied areas or cells. The black areas or cells in occupancy grids 601, 603 identify free areas or cells. Occupancy grids 601 and 603 are examples for occupancy grid 507 of FIG. 5.

Namely, in summary, the present invention includes the idea of using one or more methods for scene categorization from images, in order to classify the presently existing driving situation based on a vehicle driving environment sensed with the aid of a driving-environment sensor system. As a rule, such methods are based on extraction of suitable features from the image data and subsequent classification. Advantageously, these methods may easily be transferred directly for use in a driver assistance system and/or in an automated driving function, for example, by extracting features from a single driving-environment sensor, and implementing a classification into the various driving situations to be anticipated based on these features (see block diagram of FIG. 4). Given the presence of a plurality of driving-environment sensors, it is especially advantageous to use not the data of a single sensor, but rather the merger result of all driving-environment sensors as input for the classification (see block diagram of FIG. 5 and corresponding explanations).

Namely, in this manner, it is thus advantageously possible to determine the driving situation in which a vehicle currently finds itself, e.g., "driving on a freeway", "driving in a traffic jam", "waiting at an intersection", "maneuvering in a parking place". Advantageously, this determination may therefore be accomplished online in the vehicle, thus, quasi in real time, a rapid and at the same time reliable classification being rendered possible due to the use of the methods indicated above. For example, such a method may be used in an automated vehicle for adapting the vehicle behavior to the current driving situation or to ensure that the activation conditions are satisfied for an automated driving function if it is intended to be usable only in a specific driving situation (compare, for example, only in parking places, only on freeways). According to one specific embodiment, the usage explained above is also provided.

What is claimed is:

1. A method for determining a presently existing driving situation in which a vehicle finds itself at the moment, comprising:
   receiving driving-environment data based on a sensed vehicle driving environment;
   extracting features from the driving-environment data with the aid of pattern recognition;
   classifying the presently existing driving situation based exclusively on the features extracted by the pattern recognition;
   providing a result of the classification; and
   sensing, by each of the driving-environment sensors, the vehicle driving environment and providing individual driving-environment sensor data corresponding to the vehicle driving environment sensed in each case, the individual driving-environment sensor data being merged together, so that merged driving-environment sensor data is determined, the driving-environment data being ascertained based on the merged driving-environment sensor data;
   wherein based on the sensed vehicle driving environment, an occupancy grid is determined including a plurality of cells, each of which has an occupancy probability, the driving-environment data being ascertained based on the respective occupancy probabilities.

2. The method as recited in claim 1, wherein the occupancy probabilities are determined based on the merged driving-environment sensor data, the driving-environment data being ascertained based on the respective occupancy probabilities.

3. The method as recited in claim 1, wherein the cells are assigned a further property which is determined based on the sensed vehicle driving environment.

4. The method as recited in claim 1, further comprising: operating the vehicle in at least a partially automated fashion based on the provided classification.

5. The method as recited in claim 1, wherein the vehicle includes a driving-environment sensor system has a plurality of driving-environment sensors, and the method further comprising:
   sensing, by each of the driving-environment sensors, the vehicle driving environment and providing individual driving-environment sensor data corresponding to the vehicle driving environment sensed in each case, the individual driving-environment sensor data being merged together, so that merged driving-environment sensor data is determined, the driving-environment data being ascertained based on the merged driving-environment sensor data.

6. The method as recited in claim 1, wherein the vehicle has a driver assistance system for making an at least partially automated driving function available, and the method further comprises:
   activating the driver assistance system for guiding the vehicle only if the driving function is usable for the classified driving situation existing at the moment.

7. The method as recited in claim 1, wherein the classification is carried out based on a method for scene categorization from images.

8. An apparatus for determining a presently existing driving situation in which a vehicle finds itself at the moment, comprising:
   a communication interface configured to receive driving-environment data based on a sensed vehicle driving environment; and
   a processing device configured to extract features from the driving-environment data with the aid of pattern recognition, and to classify the presently existing driving situation based exclusively on the features extracted by the pattern recognition;
   wherein the communication interface is configured to provide a result of the classification;
   wherein based on the sensed vehicle driving environment, an occupancy grid is determined including a plurality of cells, each of which has an occupancy probability, the driving-environment data being ascertained based on the respective occupancy probabilities.

9. A system for determining a presently existing driving situation in which a vehicle finds itself at the moment, comprising:
   an apparatus configured to determine a presently existing driving situation in which a vehicle finds itself at the moment, the apparatus including a communication interface configured to receive driving-environment data based on a sensed vehicle driving environment, and a processing device configured to extract features from the driving-environment data with the aid of pattern recognition, and to classify the presently existing driving situation based exclusively on the features extracted by the pattern recognition, wherein the communication interface is designed to provide a result of the classification;

a driving-environment sensor system configured to sense a vehicle driving environment, the driving-environment sensor system being configured to determine driving-environment data based on the sensed vehicle driving environment and to transmit it to the apparatus; and a control device for the at least partially automated guidance of the vehicle based on the result provided;

wherein based on the sensed vehicle driving environment, an occupancy grid is determined including a plurality of cells, each of which has an occupancy probability, the driving-environment data being ascertained based on the respective occupancy probabilities.

10. A non-transitory computer-readable storage medium on which is stored a computer program for determining a presently existing driving situation in which a vehicle finds itself at the moment, the computer program, when executed by a computer, causing the computer to perform:

receiving driving-environment data based on a sensed vehicle driving environment;

extracting features from the driving-environment data with the aid of pattern recognition;

classifying the presently existing driving situation based exclusively on the features extracted by the pattern recognition; and providing a result of the classification;

wherein based on the sensed vehicle driving environment, an occupancy grid is determined including a plurality of cells, each of which has an occupancy probability, the driving-environment data being ascertained based on the respective occupancy probabilities.

11. The non-transitory computer-readable storage medium as recited in claim 10, wherein the computer program further causes the computer to perform: operating the vehicle in at least a partially automated fashion based on the provided classification.

* * * * *